April 10, 1928.                     1,665,241
C. W. WEISS
UNIVERSAL JOINT
Filed Feb. 18, 1927          2 Sheets-Sheet 1
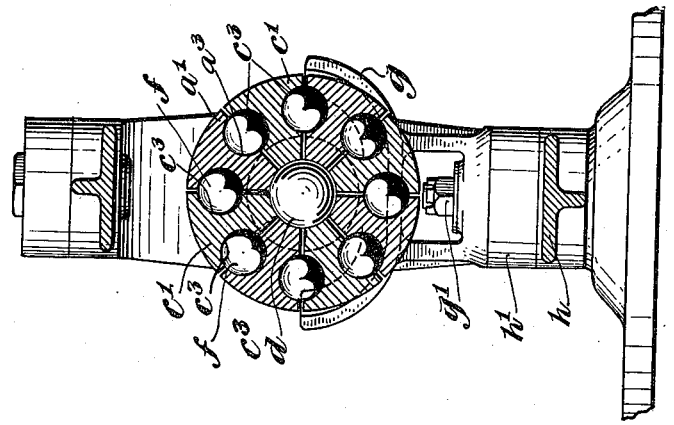
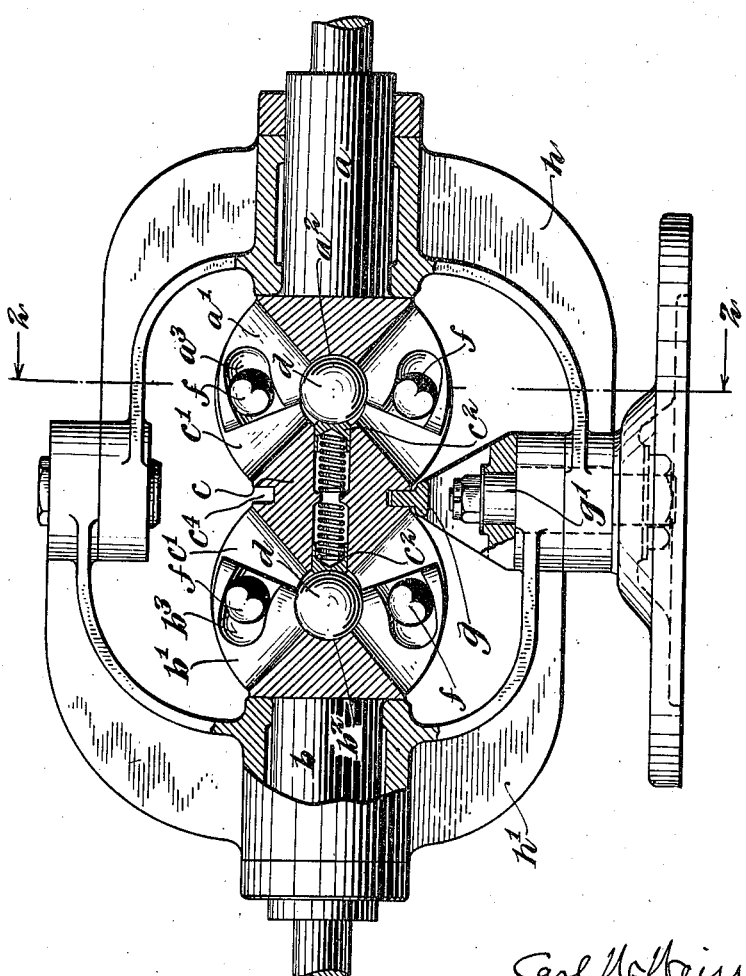
INVENTOR
Carl W. Weiss
BY
Redding, Greeley, O'Shea & Campbell
ATTORNEYS April 10, 1928.

C. W. WEISS 1,665,241

UNIVERSAL JOINT

Filed Feb. 18, 1927

INVENTOR

Carl W. Weiss

BY Redding, Greeley, O'Shea & Campbell

ATTORNEYS

Patented Apr. 10, 1928.

1,665,241

UNITED STATES PATENT OFFICE.

CARL W. WEISS, OF BROOKLYN, NEW YORK.

UNIVERSAL JOINT.

Application filed February 18, 1927. Serial No. 169,152.

This invention relates to universal joints of the character of that shown in Letters Patent of the United States No. 1,522,351, January 6, 1925, in which two members capable of relative angular displacement have coacting portions with their proximate faces formed with non-concentric but intersecting grooves, with a relatively movable body received partly in each of such grooves and through which force is transmitted from one coacting portion to the other. The joint shown in that patent has been found entirely practicable for an angular displacement of the two shafts of at least thirty degrees and the object of the present invention is to adapt the joint for a much greater angular displacement. The joint now to be described has been found to be practicable for an angular displacement of at least sixty degrees.

In accordance with the present invention, the two main members of the joint are formed substantially as before and between them is interposed an intermediate member which is formed at its ends for coaction with the main members and through which power is transmitted from one main member to the other. Suitable provisions are made for supporting the intermediate member and retaining it in operative relationship, such means being varied to suit different conditions of use. The invention is illustrated in the accompanying drawings in several embodiments.

Figure 1 is a view in longitudinal sectional elevation of one embodiment of the invention.

Figure 2 is a view in transverse section on the plane indicated by the broken line 2—2 of Figure 1.

In the embodiment of the invention shown in Figures 1 and 2, one of the main members $a$, which may be either the driving member or the driven member, is shown as formed with three finger-like portions or projections $a'$ with radial faces and designed to coact with corresponding portions of the intermediate member hereinafter described. The other main member $b$ is similarly formed with finger-like portions or projections $b'$, for coaction with the other end of the intermediate member.

An intermediate member $c$, of suitable length, is similarly formed at each end with finger-like portions or projections $c'$ for coaction with the portions or projections $a'$ and $b'$ of the main members $a$ and $b$ respectively. This intermediate member $c$ may be centered with respect to the two main members $a$ and $b$ by any convenient means, as, for example, a spherical bearing $d$ at each end, received in a socket $a^2$ or $b^2$ formed in the corresponding member $a$ or $b$ and pressed into such sockets by spring-pressed, spherically socketed plungers $c^2$ carried by the intermediate member $c$.

The proximate faces of the coacting portions $a'$, $b'$, $c'$, of the main members $a$ and $b$ and the intermediate member $c$ respectively, have formed therein, as described in said patent, non-concentric grooves $a^3$, $b^3$ and $c^3$ respectively, with their longitudinal axes intersecting at an angle, and in the grooves of each pair is placed a relatively movable, preferably spherical, body $f$ which forms a point of operative engagement or of transmission of pressure which shifts its position as the angular displacement of the two main members and the intermediate member is varied, so that the plane of its orbit bisects the angle of displacement of each main member and the intermediate member, all as fully explained in said patent, whereby the angular velocity of each member of the joint is always the same as that of each other member and is always uniform if the angular velocity of the driving member is uniform.

Figure 3:
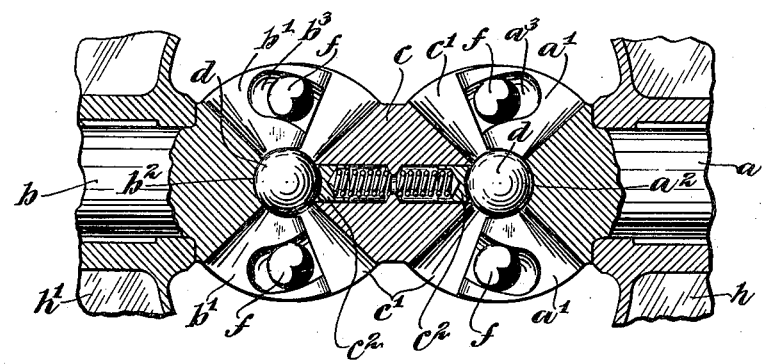
Figure 3 is a partial view in longitudinal sectional elevation illustrating particularly different means for supporting the intermediate member.

Under some conditions of use the intermediate member will be sufficiently supported and maintained in operative relation by the spherical bearing members $d$ and the coacting spring-pressed plungers, as shown, for example, in Figure 3. Under other conditions of use, however, as in front wheel drives, for example, it may be desirable to provide other or additional means for supporting the intermediate member. In the construction shown in Figures 1 and 2, the intermediate member $c$ is grooved at its equator, as at $c^4$, such groove being engaged by a flattened, elliptical guide-piece $g$ so as to permit transverse sliding movement of the intermediate member, such guide-piece $g$ being swiveled, as indicated at $g'$, on one of the swiveled yokes $h$, $h'$ which support the main members $a$, $b$, the axis of the swiveled support of the guide-piece $g$ coinciding with the axis on which the two yokes $h$, $h'$ are swiveled, so that the intermediate member shall always center itself with respect to the two main members of the joint, regardless of the angular displacement of either within the limits found to be practicable.

Figure 4:
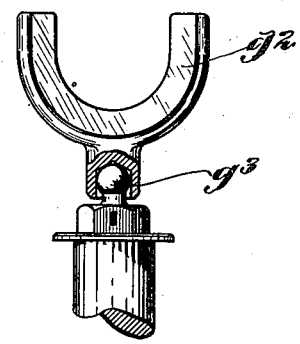
Figure 4 is a detail view in sectional elevation illustrating still another means for supporting the intermediate member.

Another form of support for the intermediate member, which also permits the intermediate member to adapt itself in position, is shown in Figure 4. In this form of support a guide-piece $g^2$, elongated vertically and adapted to engage the grooved intermediate member as before, is supported on the ball and socket joint $g^3$, also in the plane of the center of the joint, such guide-piece yielding to every angular displacement of the intermediate member.

Various other embodiments of the invention will suggest themselves as requirements of use may indicate.

I claim as my invention:

1. A universal joint having two main members capable of relative angular displacement, an intermediate member also capable of relative angular displacement, the said several members having coacting portions with their proximate faces formed with non-concentric grooves with their longitudinal axes intersecting at an angle, a relatively movable body received partly in each groove of each pair and through which force is transmitted from one member to another, and means to support the intermediate member in operative relation with the two main members with freedom for angular displacement.

2. A universal joint having two main members capable of relative angular displacement, an intermediate member also capable of relative angular displacement, the said several members having coacting portions with their proximate faces formed with non-concentric grooves with their longitudinal axes intersecting at an angle, a relatively movable body received partly in each groove of each pair through which force is transmitted from one member to another, said intermediate member being grooved at its equator, a guide-piece engaging the groove of the intermediate member, and means to support the guide-piece in the plane of the center of the joint with capacity for angular adjustment.

3. A universal joint having two main members capable of relative angular displacement, an intermediate member also capable of relative angular displacement, the said several members having coacting portions with their proximate faces formed with non-concentric grooves with their longitudinal axes intersecting at an angle, a relatively movable body received partly in each groove of each pair and through which force is transmitted from one member to another, each of said main members being formed with a spherical socket, a spherical bearing between each end of the intermediate member and the corresponding main member, and means carried by the intermediate member to press the spherical bearings into the corresponding sockets.

4. A universal joint having two main members capable of relative angular displacement, an intermediate member also capable of relative angular displacement, the said several members having coacting portions with their proximate faces formed with non-concentric grooves with their longitudinal axes intersecting at an angle, a relatively movable body received partly in each groove of each pair and through which force is transmitted from one member to another, a spherical bearing between each end of the intermediate member and the corresponding member, and spring-pressed plungers carried by the intermediate member and engaging the spherical bearings to press them into sockets of the main members.

This specification signed this 14th day of February A. D. 1927.

CARL W. WEISS.